United States Patent
Saito et al.

(10) Patent No.: US 9,612,485 B2
(45) Date of Patent: Apr. 4, 2017

(54) METHOD OF MANUFACTURING DISPLAY APPARATUS

(71) Applicant: Japan Display Inc., Minato-ku (JP)

(72) Inventors: Kenji Saito, Minato-ku (JP); Akira Minami, Minato-ku (JP); Mariko Nagai, Minato-ku (JP); Yoshinori Yamamoto, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 185 days.

(21) Appl. No.: 14/561,559

(22) Filed: Dec. 5, 2014

(65) Prior Publication Data
US 2015/0160487 A1    Jun. 11, 2015

(30) Foreign Application Priority Data

Dec. 11, 2013  (JP) ................................. 2013-256156

(51) Int. Cl.
G02F 1/00 (2006.01)
B32B 37/12 (2006.01)
G02F 1/1341 (2006.01)
G02F 1/1339 (2006.01)

(52) U.S. Cl.
CPC ........ *G02F 1/1341* (2013.01); *B32B 37/1292* (2013.01); *B32B 2457/202* (2013.01); *G02F 1/1339* (2013.01); *G02F 2202/28* (2013.01); *Y10T 156/10* (2015.01)

(58) Field of Classification Search
CPC ........... B32B 2457/202; B32B 37/1292; G02F 1/1339; G02F 2022/28; G02F 1/133351
See application file for complete search history.

(56) References Cited

U.S. PATENT DOCUMENTS

2004/0131759 A1* 7/2004 Jung ..................... G02F 1/1339
427/8
2007/0095468 A1* 5/2007 Kim .................... B29C 47/0019
156/275.3

FOREIGN PATENT DOCUMENTS

JP         2014-32249         2/2014

* cited by examiner

*Primary Examiner* — Carson Gross
(74) *Attorney, Agent, or Firm* — Oblon, McClelland, Maier & Neustadt, L.L.P.

(57) ABSTRACT

A method of manufacturing a display apparatus includes: applying a first sealing material along both sides in a row direction of array substrate areas on a first mother board including a plurality of the array substrate areas formed in a matrix pattern, applying a second sealing material along both sides in a column direction of counter substrate areas on a second mother board including a plurality of the counter substrate areas formed in a matrix pattern, filling the first mother board with a liquid crystal material; and adhering the first mother board and the second mother board to each other.

12 Claims, 8 Drawing Sheets

METHOD OF MANUFACTURING DISPLAY APPARATUS

CROSS-REFERENCE TO RELATED APPLICATIONS

This application is based upon and claims the benefit of priority from the prior Japanese Patent Application No. 2013-256156, filed on Dec. 11, 2013; the entire contents of which are incorporated herein by reference.

FIELD

The present invention relates to a method of manufacturing a display apparatus.

BACKGROUND

In the related art, a liquid crystal cell is manufactured by aligning and adhering a first mother board including a plurality of array substrates and a second mother board including a plurality of counter substrates to each other, and then cutting out a pair of the array substrate and the counter substrate opposing each other. In order to the adhesion, a sealing material is provided on a display area of the array substrate in a frame shape, and the array substrate and the counter substrate are fixed with the sealing material.

In the case where the sealing material is applied to a substrate such as the first mother board or the second mother board, the sealing material is pushed out from an application head while moving the application head with respect to the substrate in a frame shape like one-stroke drawing.

When applying the sealing material to corners of the substrate, the application head is subjected to cornering. Therefore, an excitation force is applied to the application head. However, if frame areas at the corners of the array substrate are reduced, a curvature of the corners becomes small correspondingly, and the excitation force is increased. Consequently, the sealing material at the corners swells and hence application at an acute angle cannot be achieved. In contrast, if a speed of movement of the application head is reduced in order to avoid such a circumstance, there arise problems that the applied sealing material is increased in width, and that the application time is increased.

In view of such problems, it is an object of the invention to provide a method of manufacturing a display apparatus configured to be capable of forming a sealing material at an acute angle at corners of a substrate.

DETAILED DESCRIPTION

Figure 1:
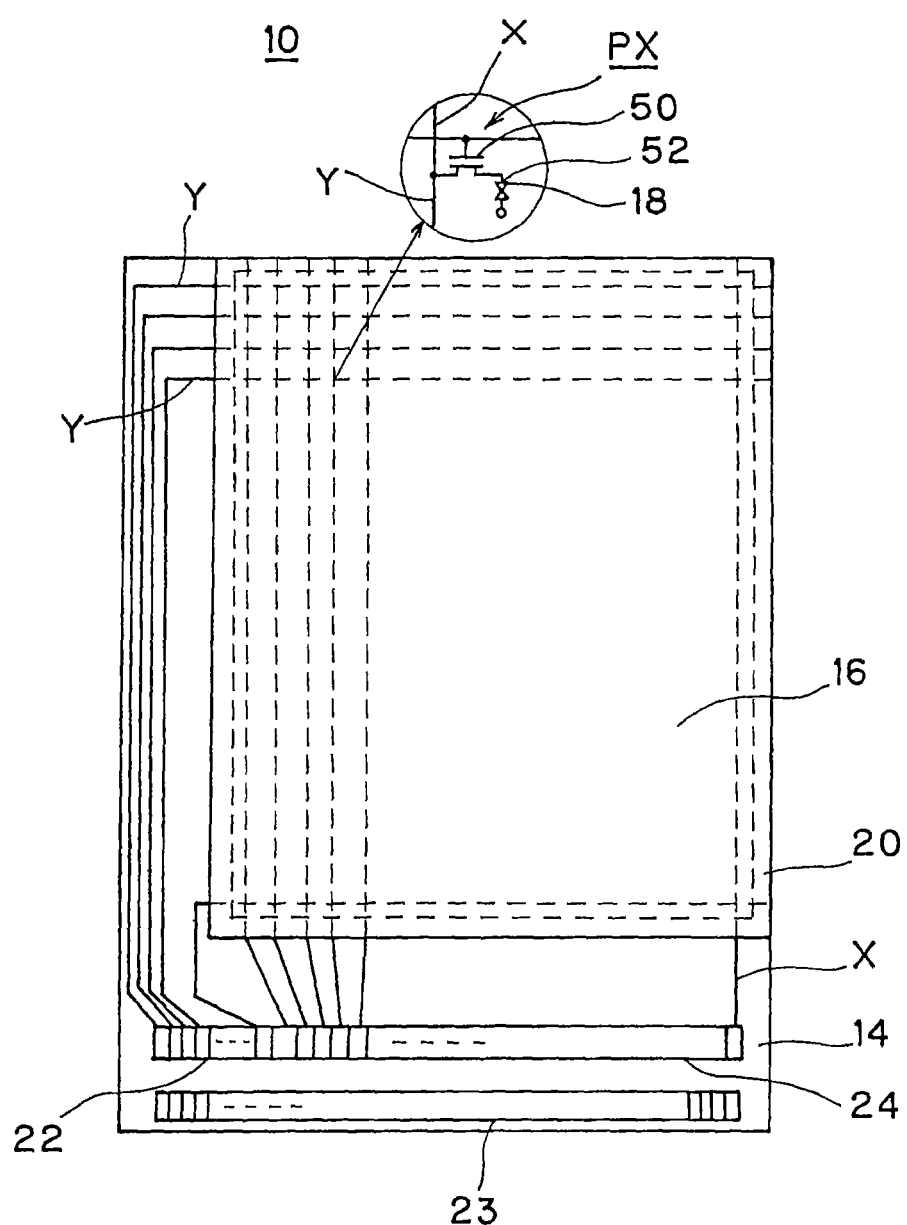
FIG. 1 illustrates a front view of a liquid crystal cell in a liquid crystal display apparatus of an embodiment.

According to embodiments, there is provided a method of manufacturing a display apparatus including: applying a first sealing material on both sides of array substrate areas of a first mother board including a plurality of the array substrate areas formed in a matrix pattern, and along a row direction or a column direction; applying a second sealing material on both sides of counter substrate areas of a second mother board including a plurality of the counter substrate areas formed in a matrix pattern, and along the column direction or the row direction; and adhering the first mother board and the second mother board to each other so that positions of the respective array substrates and the respective counter substrates match each other to make the first sealing material and the second sealing material intersect each other, so that display areas of the array substrates and the counter substrates are surrounded by the first sealing material and the second sealing material.

Preferably, the first sealing material is formed by moving a first application nozzle configured to push out a seal agent on the first mother board linearly in the row direction or the column direction, and the second sealing material is formed by moving a second application nozzle configured to push out the sealing agent on the second mother board linearly in the column direction or the row direction.

Preferably, the first application nozzle includes a plurality of push-out ports from which the seal agent is pushed out, and the second application nozzle includes a plurality of push-out ports from which the seal agent is pushed out.

Hereinafter, a method of manufacturing a liquid crystal display apparatus 10, which is one of display apparatus of embodiments of the invention will be described with reference to FIG. 1 to FIG. 8.

Disclosure in the embodiment is an example only, and modifications as needed which can be imagined easily by those skilled in the art without departing from the gist of the invention are included in the scope of the invention as a matter of course. In order to further clarify the description, drawings may be schematically illustrated in terms of width, thickness, and shape of the respective portions differently from the reality. However, those illustrated in the drawings are not more than examples, and are not intended to limit the understanding of the invention.

In this specification and the drawings, the same components described in the drawings which have been described before are denoted by the same reference numerals and detailed description may be omitted as needed.

Figure 2:
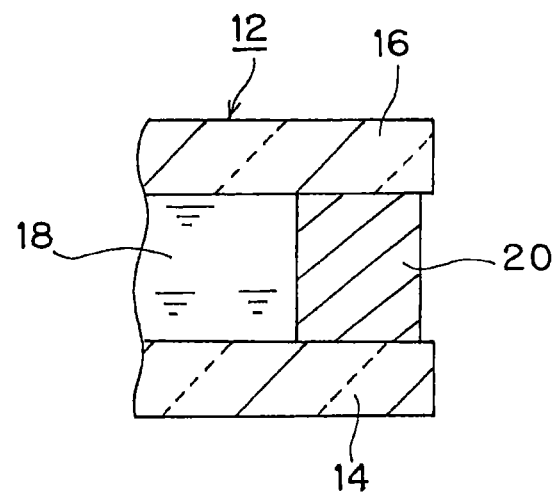
FIG. 2 illustrates a vertical cross-sectional view of an end portion of the liquid crystal display apparatus.

The structure of the liquid crystal display apparatus 10 will be described with reference to FIG. 1 and FIG. 2. FIG. 1 is a plan view of a liquid crystal cell 12 which constitutes part of the liquid crystal display apparatus 10, and FIG. 2 is an enlarged vertical cross-sectional view of an end portion of the liquid crystal cell 12.

The liquid crystal cell 12 is a member including a rectangular array substrate 14 and a counter substrate 16 adhered to each other, and a liquid crystal material 18 is held between the array substrate 14 and the counter substrate 16. In order to fix the array substrate 14 and the counter substrate 16 and encapsulate the liquid crystal material 18 therebetween, a display area of the array substrate 14 and the counter substrate 16 are surrounded by a sealing material 20 in a frame shape. The height of the sealing material 20 is, for example, 25 to 30 μm, and a seal agent which forms the sealing material 20 is formed of, for example, a UV-cured material.

The array substrate 14 is provided with pixels PX in a matrix pattern, a plurality of scanning lines Y arranged along a row direction of the pixels PX on the array substrate 14, and a plurality of signal lines X arranged along a column direction. The pixels PX are formed in the vicinity of the positions where the scanning lines Y and the signal lines X intersect. In an interior of each of the pixels PX, a TFT (Thin Film Transistor) 50 is formed. A gate terminal of the TFT 50 is connected to the scanning line Y, a source terminal thereof is connected to the signal line X, and a drain terminal thereof is connected to a pixel electrode 52. The array substrate 19 includes a terminal set 22 drawn from the respective scanning lines Y and a terminal set 24 drawn from the respective signal lines X formed on a side portion thereof, and further includes a terminal set 23 to which a flexible printed circuit (FPC) is connected formed thereon. The counter substrate 16 includes a color filter layer, a black matrix layer, and a counter electrode formed in a laminated manner.

Figure 6:
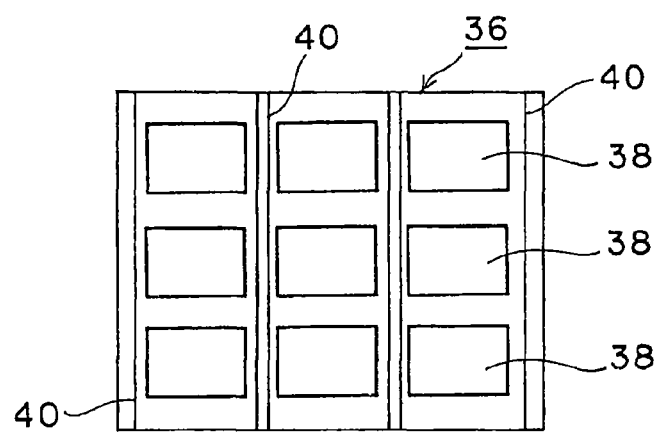
FIG. 6 illustrates a plan view of the state in which the second sealing material is applied to the second mother board.
Figure 7:
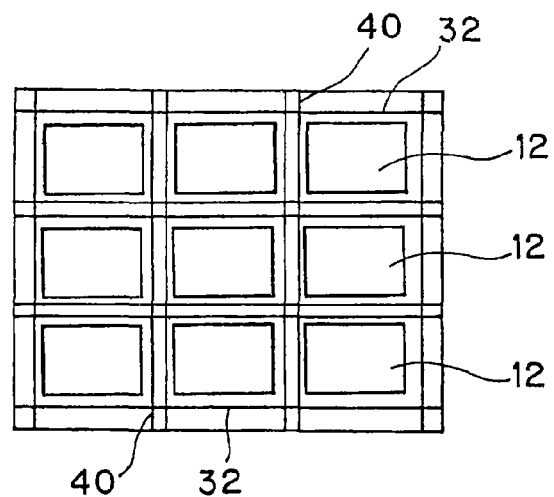
FIG. 7 illustrates a plan view of the state in which the first mother board and the second mother board are adhered to each other.
Figure 8:
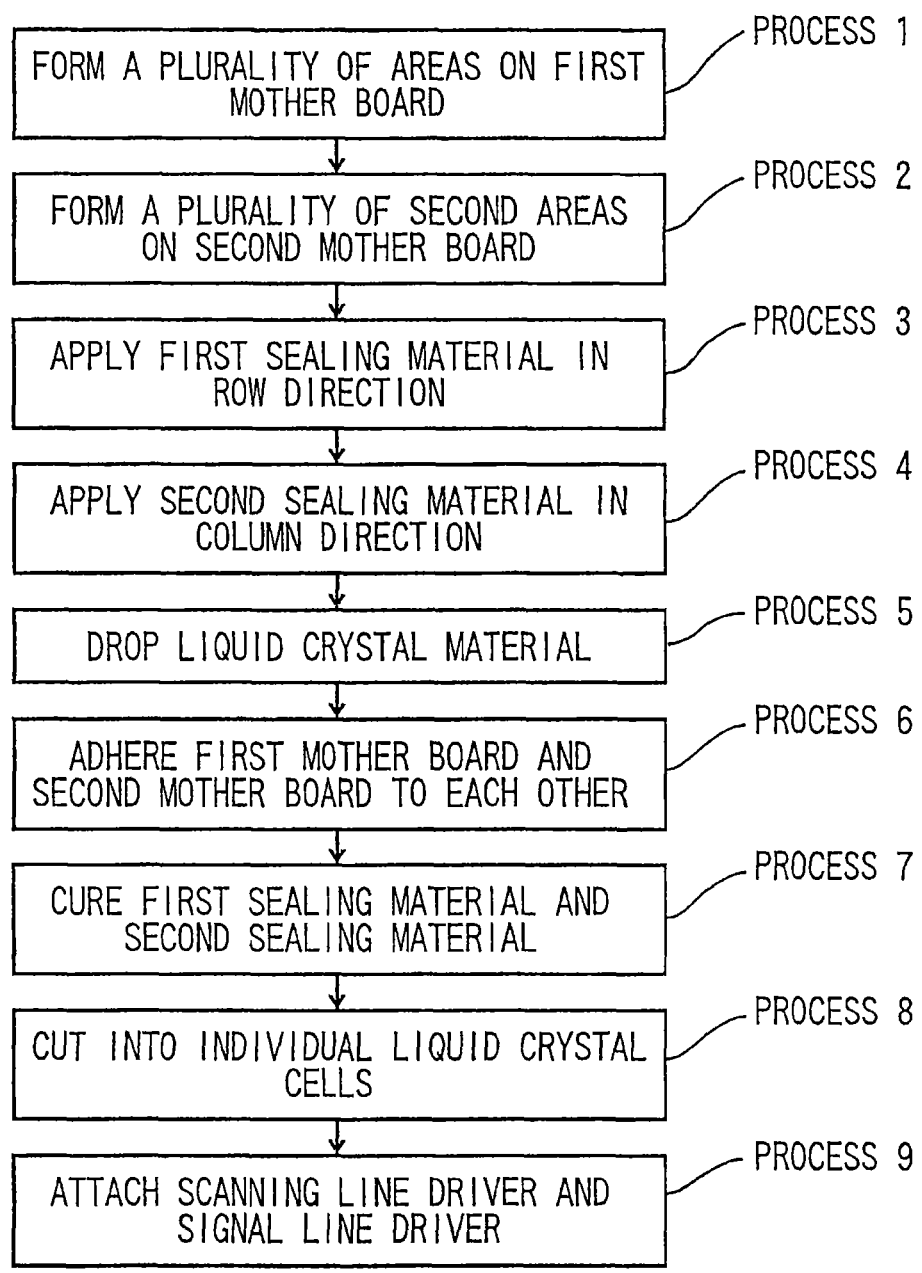
FIG. 8 illustrates a process drawing illustrating a method of manufacturing the liquid crystal display apparatus.

Subsequently, a method of manufacturing the liquid crystal display apparatus 10 will be described with reference to FIG. 3 to FIG. 7, and a process drawing of FIG. 8.

In a first process, the pixels, the signal lines, and the scanning lines which constitute part of the array substrate 14 described above are formed respectively in first areas 28 arranged in a matrix pattern on a first mother board 26 formed of a glass substrate, and the terminal set 22 and the terminal set 24 are formed out of the first areas 28. In FIG. 3 to FIG. 7, illustration of the terminal set 22 and the terminal set 24 is omitted in order to facilitate the understanding of the description.

In a second process, the color filter layer, the black matrix layer, and the counter electrode which constitute part of the counter substrate 16 described above are formed respectively in second areas 38 arranged in a matrix pattern on a second mother board 36 formed of a glass substrate.

Figure 3:
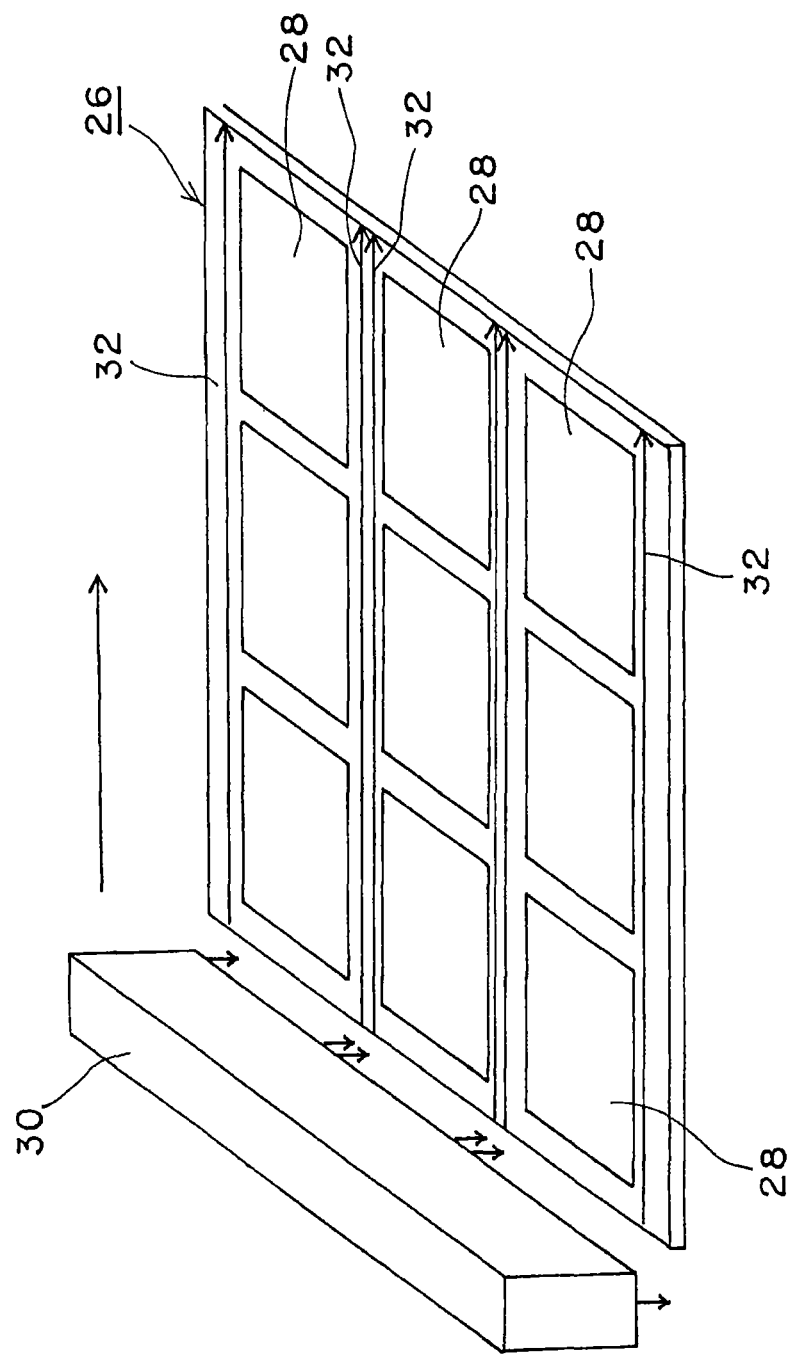
FIG. 3 illustrates a perspective view of the state in which a first sealing material is about to be applied to a first mother board.
Figure 5:
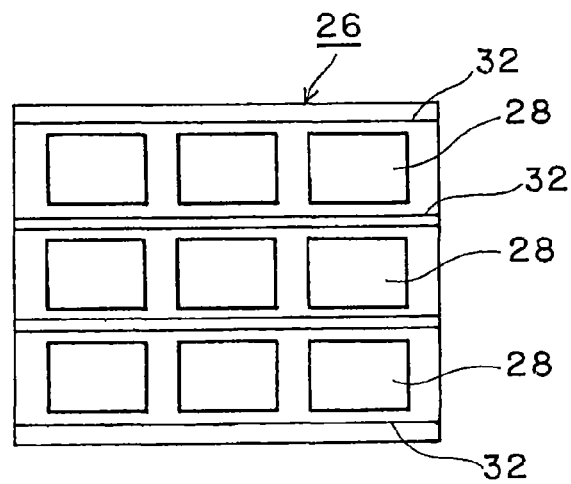
FIG. 5 illustrates a plan view of the state in which the first sealing material is applied to the first mother board.

In a third process, as illustrated in FIG. 3, the first mother board 26 is placed on a stage, and a first sealing material 32 is applied on an upper surface of the first mother board 26 with a first application nozzle 30. A plurality of push-out ports for the seal agent are formed at predetermined intervals on a lower surface of the first application nozzle 30. When the first application nozzle 30 is moved linearly along the row direction, the seal agent is pushed out from the push-out ports at predetermined intervals, and hence the first sealing material 32 may be applied on both sides in the row direction of the first areas 28 as illustrated in FIG. 5. The term "both sides in the row direction" means both upper and lower sides of the first areas 28 in FIG. 5. The push-out ports are formed respectively at positions on both sides in the row direction of the plurality of first areas 28 of the first mother board 26, where the seal agent is pushed out.

Figure 4:
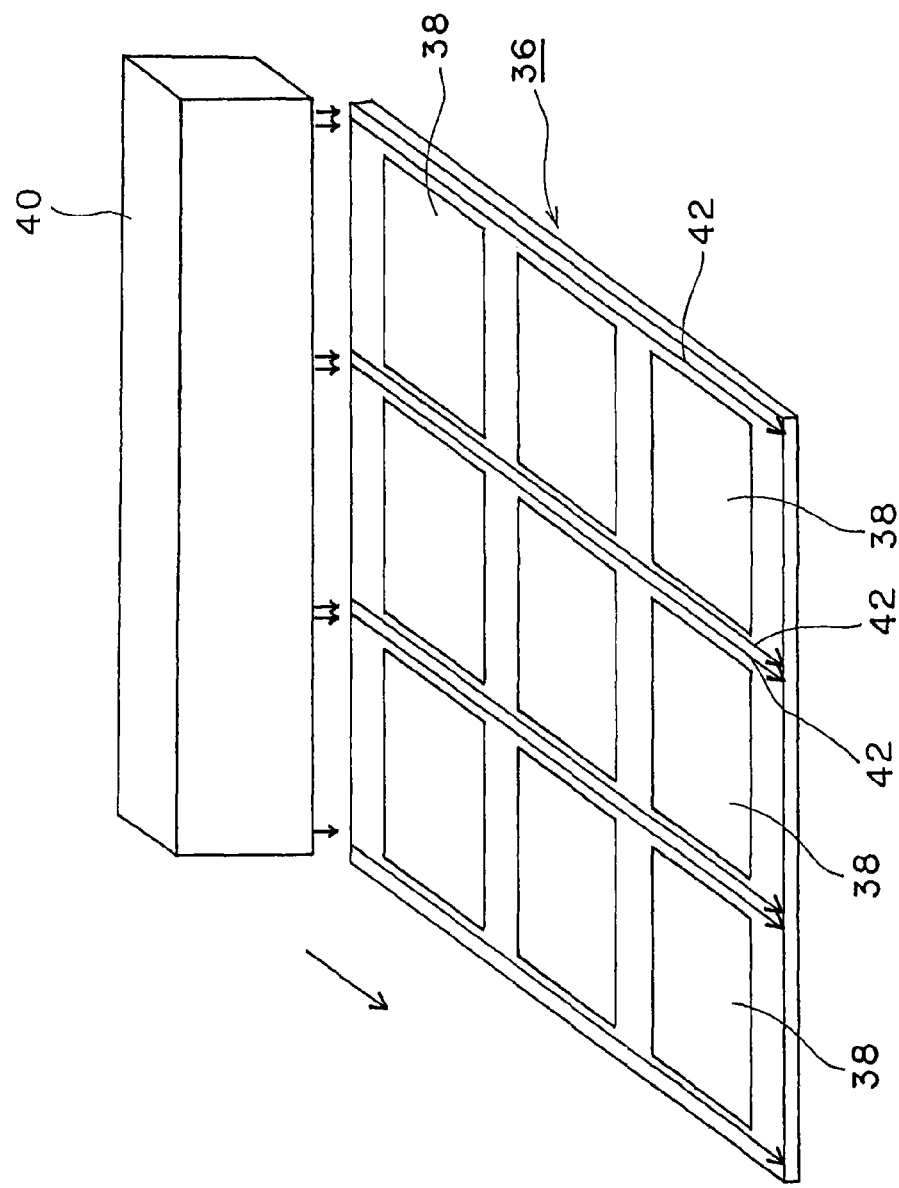
FIG. 4 illustrates a perspective view of the state in which a second sealing material is about to be applied to a second mother board.

In a fourth process, as illustrated in FIG. 4, the second mother board 36 is placed on the stage, and a second sealing material 42 is applied on an upper surface of the second mother board 36 with a second application nozzle 40. A plurality of push-out ports for the seal agent are formed at predetermined intervals on a lower surface of the second application nozzle 40. When the second application nozzle 40 is moved linearly along the column direction, the seal agent is pushed out from the push-out ports at predetermined intervals, and hence the second sealing material 42 may be applied on both sides in the column direction of the second areas 38 as illustrated in FIG. 6. The term "both sides in the column direction" here means both left and right sides of the second areas 38 in FIG. 6. The push-out ports are formed respectively at positions on both sides in the column direction of the plurality of second areas 38 of the second mother board 36, where the seal agent is pushed out.

In a fifth process, the liquid crystal material 18 is dropped on center portions of the respective first areas 28 of the first mother board 26.

In a sixth process, the first mother board 26 and the second mother board 36 are adhered to each other so that the first areas 28 and the second areas 38 match. In this case, as illustrated in FIG. 7, the first mother board 26 and the second mother board 36 are adhered so that the first sealing material 32 applied in the row direction and the second sealing material 42 applied in the column direction are orthogonal to each other. At the time of adhesion, the first mother board 26 on which the liquid crystal material 18 is dropped is maintained in the horizontal position, and the second mother board 36 is covered from above.

In a seventh process, in the state in which the first mother board 26 and the second mother board 36 are adhered to each other, the first sealing material 32 and the second sealing material 42 formed of a UV-cured material are cured by irradiating a UV ray. Accordingly, the frame-shaped sealing material 20 including the first sealing material 32 and the second sealing material 42 is completed.

In an eighth process, the first mother board 26 and the second mother board 36 adhered to each other are cut into individual liquid crystal cells 12 composed of a pair of the array substrate 14 and the counter substrate 16 opposing each other. Accordingly, the liquid crystal cell 12 having the liquid crystal material 18 interposed between the array substrate 14 and the counter substrate 16 is completed by the sealing material 20 as illustrated in FIG. 1.

In a ninth process, drive ICs having a scanning line dive circuit and a signal line circuit are mounted to the terminal set 22 and the terminal set 24 of the liquid crystal cell 12, an FPC is connected to the terminal set 23, whereby the liquid crystal display apparatus 10 is completed.

According to the embodiment, by applying the first sealing material 32 to the first mother board 26 in the row direction, applying the second sealing material 42 to the second mother board 36 in the column direction, and adhering the mother boards each other, portions where the first sealing material 32 and the second sealing material 42 intersect may be adhered at an acute angle, specifically, in an orthogonal state when being adhered and do not have a curved shape as in the related art.

The application of the sealing material to the respective boards 26 and 36 may be achieved only by applying the same once linearly thereto with the first application nozzle 30 and the second application nozzle 40, respectively, so that the application time may be reduced by an application like one-stroke drawing as in the related art.

In the case where the first sealing material is applied only to one of the first mother board and the second mother board in the row direction and the second sealing material is applied in the column direction, the application nozzle for the sealing material to be applied later may come into contact with the sealing material applied previously. Therefore, in order to prevent the contact, the subsequent application nozzle needs to be moved upward at the corresponding position. Consequently, faint application or swelling of the sealing material may occur, and a normal application is not achieved. However, in the case of the embodiment, since the first application nozzle 30 and the second application nozzle 40 need only to be moved linearly on the first mother board and the second mother board, respectively, there is no probability of contact and the seal agent can be applied linearly and stably. Since the speed of application is constant and the movement faster than the relate art is possible, occurrence of faint application or swelling of the sealing material 20 or increase in width of the applied sealing material 20 is prevented and, in addition, the application time is reduced. In addition, linear patterns illustrated in FIG. 1, of the sealing materials 32 and 42 may form an acute angle at corners of the liquid crystal display apparatus 10 after adhesion.

In the embodiment described above, the first sealing material 32 is applied to the first mother board 26 along the row direction and the second sealing material 42 is applied to the second mother board 36 in the column direction. Instead, however, a configuration in which the first sealing material 32 is applied in the column direction and the second sealing material 42 is applied in the row direction is also applicable.

In the embodiment described above, the application nozzles 30 and 40 are moved with respect to the substrate. Instead, however, the stages on which the first mother board 26 and the second mother board 36 are respectively placed may be moved relative to each other.

In the embodiment described above, the liquid crystal material is dropped on the first mother board 26. Instead, however, the liquid crystal material may be dropped on the second mother board 36.

In the embodiment described above, the liquid crystal display apparatus 10 has been described as the display apparatus. However, the invention is not limited thereto, and may be applied to, for example, an organic EL display apparatus. Specifically, the invention may be applied to an application of the first sealing material and the second sealing material that surround a light-transmissive filling material (for example, a fill material for dam & fill encapsulation, and may have an adhesive function) instead of the liquid crystal material.

Figure 9:
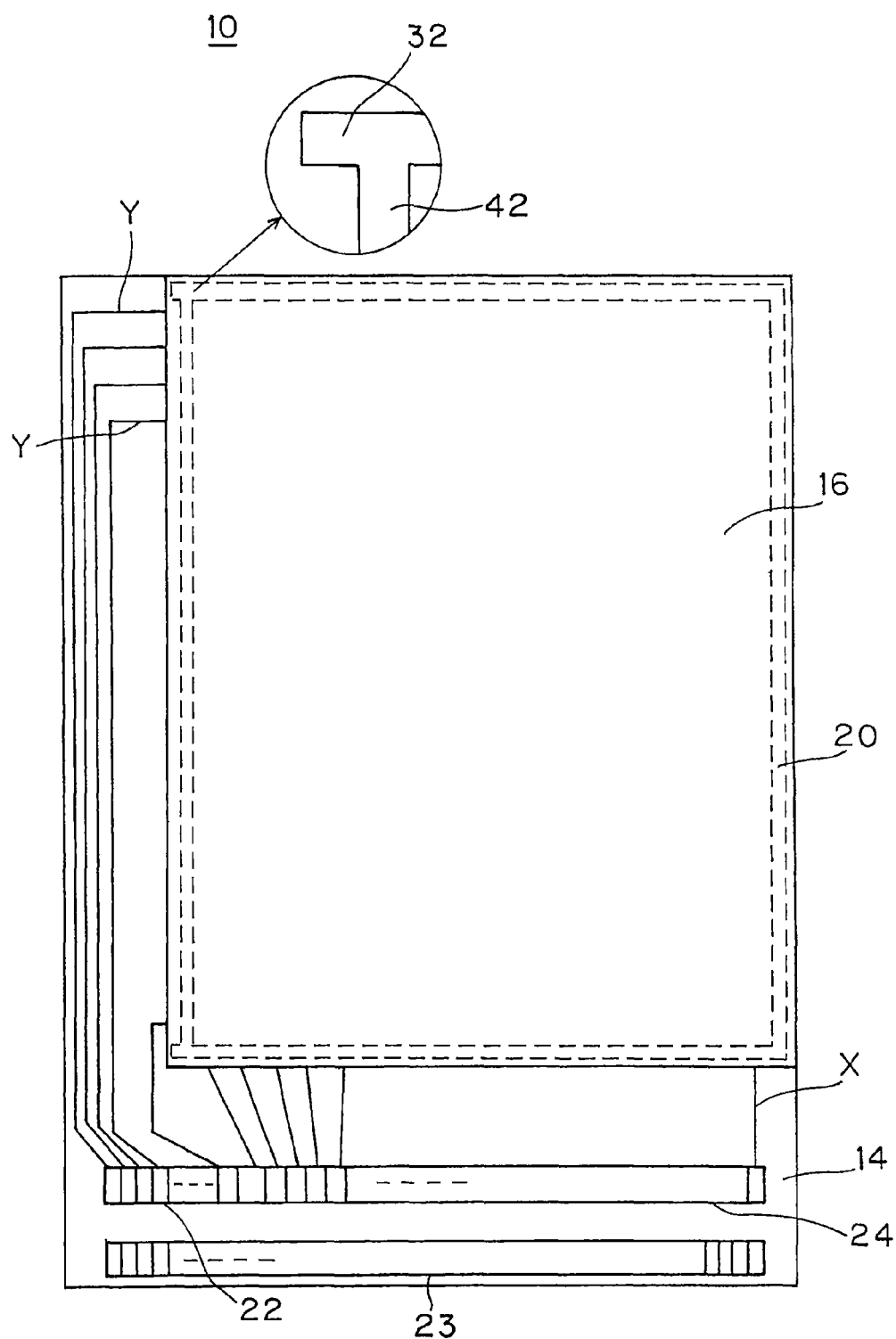
FIG. 9 illustrates a plan view of another configuration of the liquid crystal cell illustrated in FIG. 1.

A configuration of the liquid crystal cell may be as illustrated in FIG. 9, in which a linear pattern of the first sealing material 32 along the row direction has happen to be applied and is remained as extending further outward from a junction of the linear patterns of the first sealing material 32 along the row direction and the second sealing material 42 in the column direction.

Figure 10:
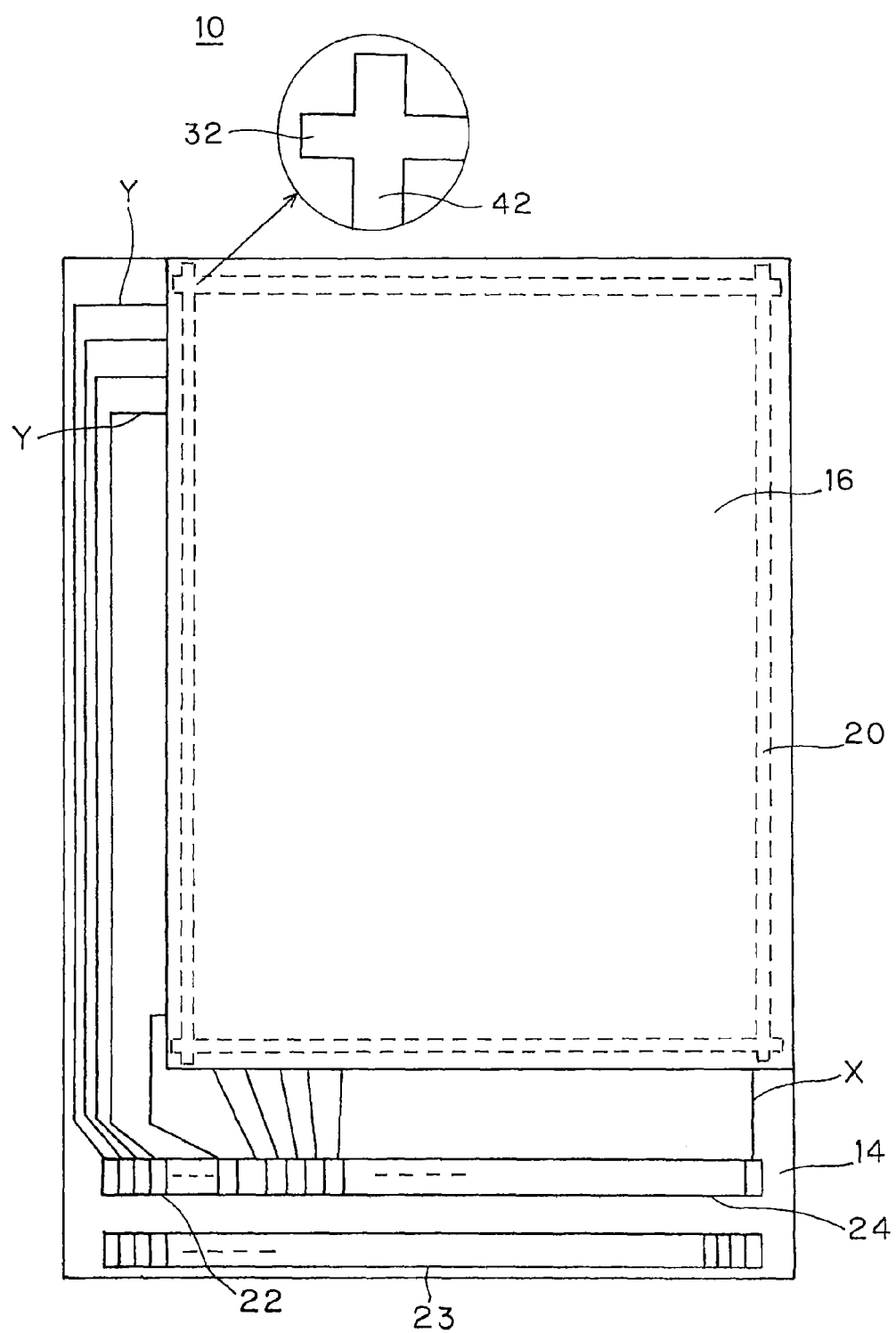
FIG. 10 illustrates a plan view of a still another configuration of the liquid crystal cell illustrated in FIG. 1.

A configuration of the liquid crystal cell may also be as illustrated in FIG. 10, in which linear patterns of the first sealing material 32 and the second sealing material 42 have happen to be applied and are remained to be extended, respectively in the row and column directions, further outward from each junction of the linear patterns.

On the basis of the embodiments of the invention, all embodiments which may be implemented by those skilled in the art by modifying the design as needed are also included in the scope of the invention as long as the gist of the invention is included.

In the category of the thought of the invention, those skilled in the art may imagine various modifications or corrections, and examples of these modifications and corrections are considered to be included within the scope of the invention. For example, those added, deleted, or modified in design of the components as needed by those skilled in the art, or those in which processes are added or deleted, or the conditions are changed may be included within the scope of the invention as long as the gist of the invention is included.

Those apparent from the description of the specification or imagined easily by those skilled in the art about other advantageous effects generated by the configuration described in the embodiment are considered by being generated by the invention as a matter of course.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a display apparatus comprising:
    applying a first sealing material on both sides of array substrate areas of a first mother board including a plurality of the array substrate areas formed in a matrix pattern, and linearly along only a row direction;
    applying a second sealing material on both sides of counter substrate areas of a second mother board including a plurality of the counter substrate areas formed in a matrix pattern, and linearly along only a column direction; and
    adhering the first mother board and the second mother board to each other so that positions of the respective array substrate areas and the respective counter substrate areas match each other to make the first sealing material and the second sealing material intersect each other, so that display areas of the array substrate areas and the counter substrate areas are surrounded by the first sealing material and the second sealing material.

2. The method of manufacturing a display apparatus according to claim 1, wherein
    the first sealing material is formed by moving a first application nozzle configured to push out a seal agent on the first mother board linearly in the row direction, and
    the second sealing material is formed by moving a second application nozzle configured to push out the seal agent on the second mother board linearly in the column direction.

3. The method of manufacturing a display apparatus according to claim 2, wherein
    the first application nozzle includes a plurality of push-out ports configured to push out the seal agent, and
    the second application nozzle includes a plurality of push-out ports configured to push out the seal agent.

4. The method of manufacturing a display apparatus according to claim 1, further comprising:
    dropping a liquid crystal material on a center portion of each of the array substrate areas of the first mother board and between the first sealing materials before adhering the first mother board and the second mother board to each other.

5. The method of manufacturing a display apparatus according to claim 1, wherein
    the first sealing materials of the array substrate areas adjacent to each other of the first mother board continue integrally.

6. The method of manufacturing a display apparatus according to claim 5, wherein
the second sealing materials of the counter substrate areas adjacent to each other of the second mother board continue integrally.

7. A method of manufacturing a display apparatus comprising:
applying a first sealing material on both sides of array substrate areas of a first mother board including a plurality of the array substrate areas formed in a matrix pattern, and linearly along only a column direction;
applying a second sealing material on both sides of counter substrate areas of a second mother board including a plurality of the counter substrate areas formed in a matrix pattern, and linearly only along a row direction; and
adhering the first mother board and the second mother board to each other so that positions of the respective array substrate areas and the respective counter substrate areas match each other to make the first sealing material and the second sealing material intersect each other, so that display areas of the array substrate areas and the counter substrate areas are surrounded by the first sealing material and the second sealing material.

8. The method of manufacturing a display apparatus according to claim 7, wherein
the first sealing material is formed by moving a first application nozzle configured to push out a seal agent on the first mother board linearly in the column direction, and
the second sealing material is formed by moving a second application nozzle configured to push out the seal agent on the second mother board linearly in the row direction.

9. The method of manufacturing a display apparatus according to claim 8, wherein
the first application nozzle includes a plurality of push-out ports configured to push out the seal agent, and
the second application nozzle includes a plurality of push-out ports configured to push out the seal agent.

10. The method of manufacturing a display apparatus according to claim 7, further comprising:
dropping a liquid crystal material on a center portion of each of the array substrate areas of the first mother board and between the first sealing materials before adhering the first mother board and the second mother board to each other.

11. The method of manufacturing a display apparatus according to claim 7, wherein
the first sealing materials of the array substrate areas adjacent to each other of the first mother board continue integrally.

12. The method of manufacturing a display apparatus according to claim 11, wherein
the second sealing materials of the counter substrate areas adjacent to each other of the second mother board continue integrally.

* * * * *